US010583786B1

(12) United States Patent
Green

(10) Patent No.: US 10,583,786 B1
(45) Date of Patent: Mar. 10, 2020

(54) MAGNETIC LADDER BRACKET

(71) Applicant: LockNClimb, LLC, Independence, KS (US)

(72) Inventor: Jeffrey Alan Green, Independence, KS (US)

(73) Assignee: LOCK N CLIMB, LLC, Independence, KS (US)

( * ) Notice: Subject to any disclaimer, the term of this patent is extended or adjusted under 35 U.S.C. 154(b) by 0 days.

(21) Appl. No.: 16/111,349

(22) Filed: Aug. 24, 2018

(51) Int. Cl.
| | |
|---|---|
| *B60R 9/042* | (2006.01) |
| *B60R 9/06* | (2006.01) |
| *F16M 13/02* | (2006.01) |
| *A47G 1/17* | (2006.01) |
| *B64F 1/22* | (2006.01) |

(52) U.S. Cl.
CPC ............... *B60R 9/06* (2013.01); *A47G 1/17* (2013.01); *B60R 9/042* (2013.01); *B60R 9/0423* (2013.01); *F16M 13/022* (2013.01); *B64F 1/225* (2013.01)

(58) Field of Classification Search
CPC ............ B60R 9/06; B60R 2011/0057; B60R 2011/007; B60R 9/042; B60R 9/0423; F16M 13/022; B64F 1/225; A47G 1/17; F16B 2001/0035
USPC .... 248/206.5, 210, 211, 316.1, 309.1, 309.4, 248/316.7, 316.8, 316.5, 224.8, 110, 113, 248/238; 182/107, 214
See application file for complete search history.

(56) References Cited

U.S. PATENT DOCUMENTS

| | | | | | |
|---|---|---|---|---|---|
| 3,880,389 | A | * | 4/1975 | Burris | F41G 11/006 248/205.1 |
| 4,727,462 | A | * | 2/1988 | Komonko | F21V 21/0965 248/206.5 |
| 4,907,769 | A | * | 3/1990 | Hunley, Jr. | F21V 21/06 248/122.1 |
| 5,577,697 | A | * | 11/1996 | Accordino | F21V 21/0965 248/206.5 |
| 6,155,523 | A | * | 12/2000 | Pitre | A47H 1/14 248/206.5 |
| 8,104,778 | B1 | * | 1/2012 | Rojas | B62B 1/14 248/98 |
| 8,651,289 | B2 | * | 2/2014 | Diaz, Jr. | A01K 97/08 206/315.1 |
| 8,714,790 | B2 | * | 5/2014 | Sparks | F21V 21/00 362/397 |
| 8,733,605 | B2 | * | 5/2014 | Pedrini | B60R 9/10 224/488 |

(Continued)

*Primary Examiner* — Nkeisha Smith
(74) *Attorney, Agent, or Firm* — Katten Muchin Rosenman LLP

(57) ABSTRACT

Disclosed herein is a magnetic ladder bracket adapted to be releasably attached to any surface having ferromagnetic properties, such as steel, iron etc. The magnetic ladder bracket comprises a base coupled to a plurality of magnets one a first side of the base and two or more brackets on a second side of the base. The plurality of magnets provide a jet blast resistant securement of the magnetic ladder bracket to the ferromagnetic surface on a tug or other vehicle. The ladder is secured to the brackets by placing a rail of the ladder in the brackets and securing the ladder using a securing mechanism, such as a pin placed across the bracket. The magnetic ladder bracket further includes one or more handles for removing the bracket from the ferromagnetic surface.

16 Claims, 5 Drawing Sheets

(56) References Cited

U.S. PATENT DOCUMENTS

| | | | | |
|---|---|---|---|---|
| 9,010,490 B1* | 4/2015 | Mosier | ............... | E06C 9/14 |
| | | | | 182/107 |
| 2014/0166832 A1* | 6/2014 | Briant | ............... | F16M 11/041 |
| | | | | 248/205.1 |
| 2015/0060378 A1* | 3/2015 | Bestor | ............... | A47B 81/005 |
| | | | | 211/70.8 |
| 2015/0097091 A1* | 4/2015 | Felsenthal | ............... | B65B 67/12 |
| | | | | 248/97 |
| 2015/0283935 A1* | 10/2015 | Marinelli | ............... | B60P 7/0846 |
| | | | | 211/61 |
| 2016/0128509 A1* | 5/2016 | Skvorecz | ............... | A47J 36/2405 |
| | | | | 248/153 |
| 2016/0130120 A1* | 5/2016 | Koberg | ............... | B66C 23/78 |
| | | | | 248/678 |
| 2016/0149386 A1* | 5/2016 | Stechmann | ............... | H02G 3/32 |
| | | | | 248/68.1 |

\* cited by examiner

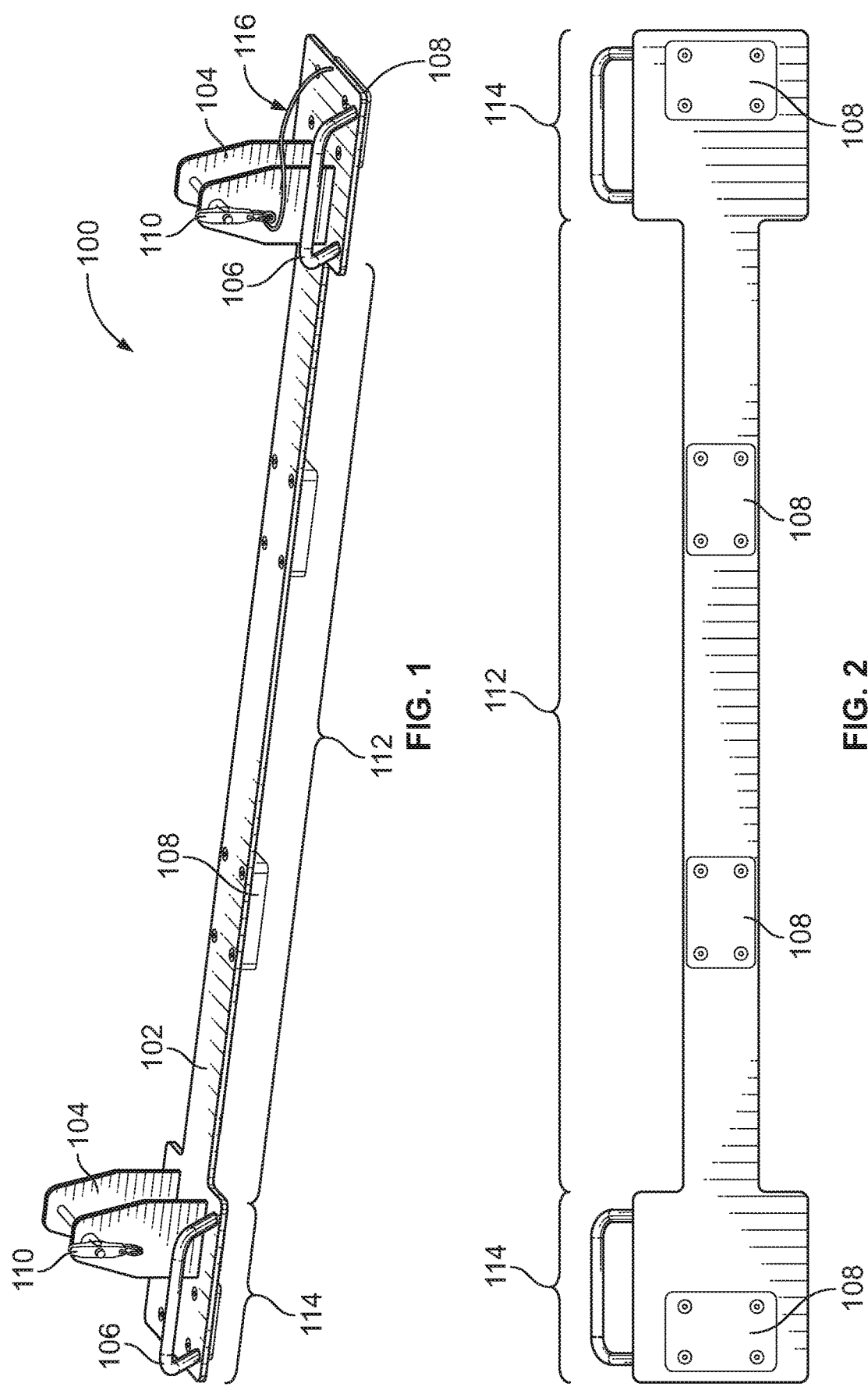

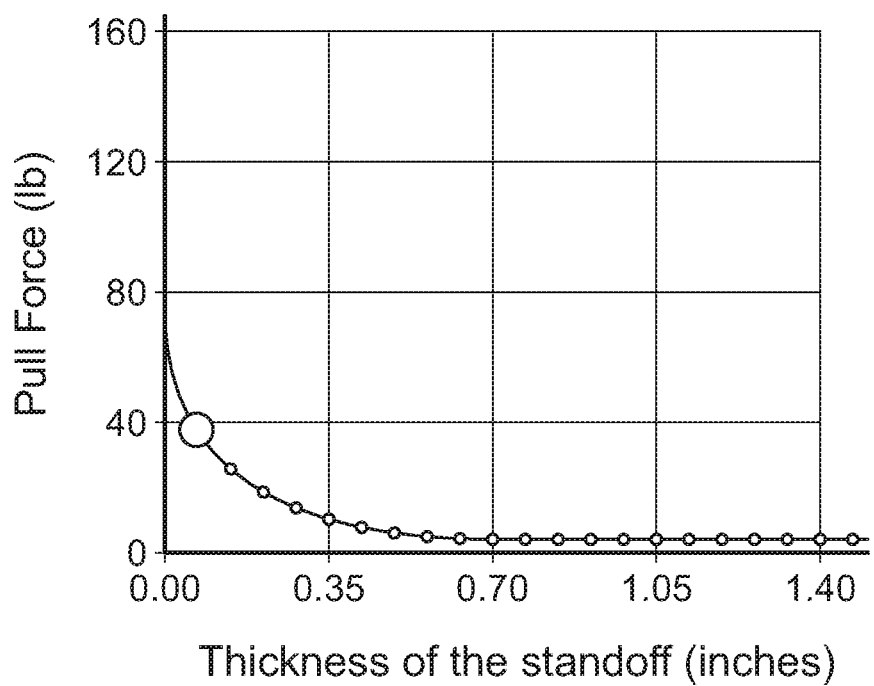
FIG. 5
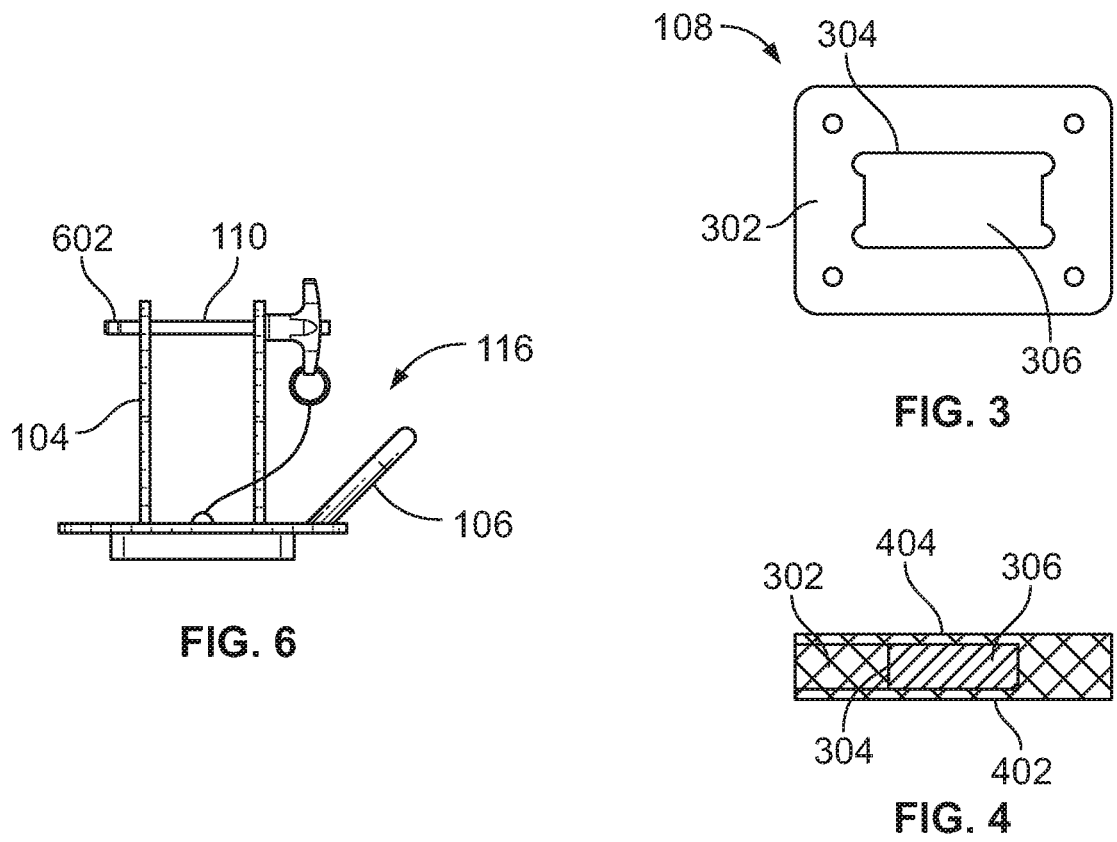
FIG. 6
FIG. 3
FIG. 4

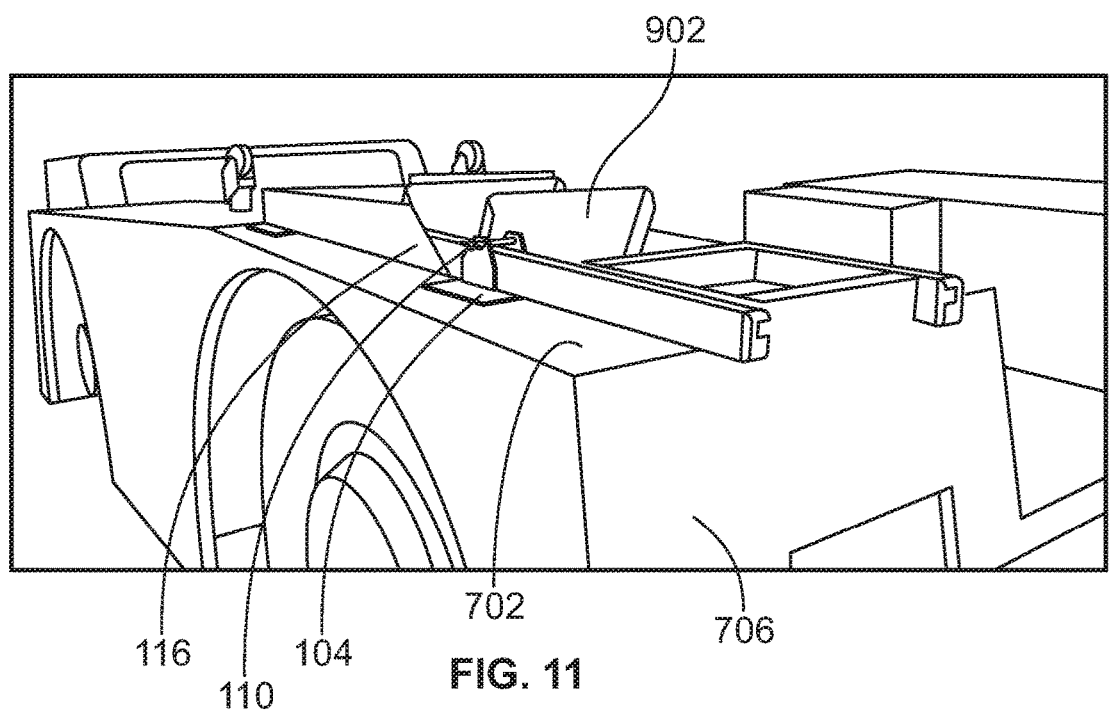
FIG. 11
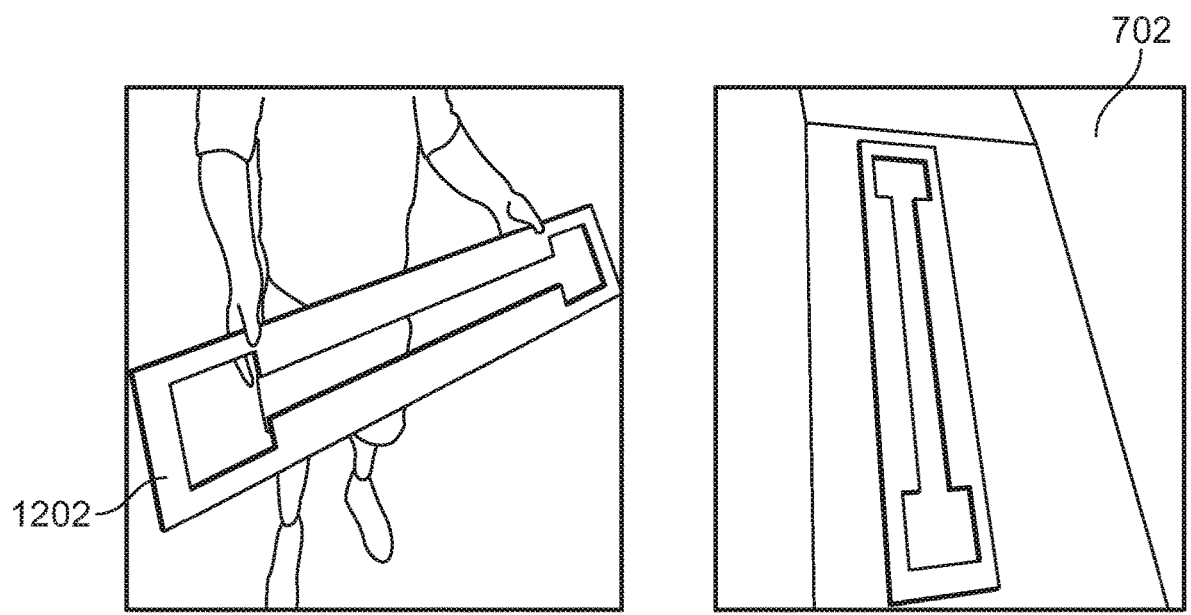
FIG. 12
FIG. 13

MAGNETIC LADDER BRACKET

FIELD OF THE INVENTION

This application discloses a magnetic ladder bracket particularly suited for securing a ladder to a tug during transport. More particularly, the present application discloses a magnetic ladder bracket that can easily be removed from the tug while still being jet blast proof.

BACKGROUND

An aircraft tug vehicle (hereinafter "tug") is a conveyance vehicle utilized to move aircraft about the tarmac or into hangers at an airport. The tug is often used to move the aircraft into positions or locations not navigable by the aircraft, such as those requiring sharp turns or precise navigation. The rear or front portions of the tug typically have a wide flat surface that can be used to transport gear or repair supplies. Often, to reach aircraft, one or more ladders is required for maintenance due to the height and/or shape of the aircraft. However, including a permanent fixture, such as a bracket, on the tug for securing the ladder or ladders remove space that may later be needed for other supplies. In addition, securing objects to the tug is important because they often operate near jet engines that are capable of exerting a sucking/blowing force on any object attached to the tug. Therefore, any securement mechanism on the tug also needs to be jet blast resistant. Accordingly, there exists a need for a removable ladder bracket for a tug, or any other vehicle, which is blast resistant. Preferably, the removable ladder bracket also does not damage the location at which it is removed.

SUMMARY

Disclosed herein is a magnetic ladder bracket adapted to be releasably attached to any surface having ferromagnetic properties, such as steel, iron etc. The magnetic ladder bracket comprises a base coupled to a plurality of magnets one a first side of the base and two or more brackets on a second side of the base. The plurality of magnets provide a jet blast resistant securement of the magnetic ladder bracket to the ferromagnetic surface on a tug or other vehicle. The ladder is secured to the brackets by placing a rail of the ladder in the brackets and securing the ladder using a securing mechanism, such as a pin placed across the bracket. The magnetic ladder bracket further includes one or more handles for removing the bracket from the ferromagnetic surface.

DESCRIPTION OF THE DRAWINGS

These and other advantages of the present invention will be readily understood with reference to the following specifications and attached drawings wherein:

FIG. 1 is a front angular perspective view of the magnetic ladder bracket of the present invention;

FIG. 2 is a bottom view of the magnetic ladder bracket;

FIG. 3 is a top view of a magnetic fixture of the magnetic ladder racket;

FIG. 4 is a side cutaway view of the magnetic fixture;

FIG. 5 is a graph depicting pull force versus distance from a steel plate;

FIG. 6 is a left side view of the magnetic ladder bracket;

FIGS. 7-11 depict the steps utilized to couple the magnetic ladder bracket to a ferromagnetic surface and a ladder to the magnetic ladder bracket; and FIGS. 12-15 depict the steps utilized to create a magnetic ladder bracket template on the ferromagnetic surface using a bracket stencil.

DETAILED DESCRIPTION

Figure 7:
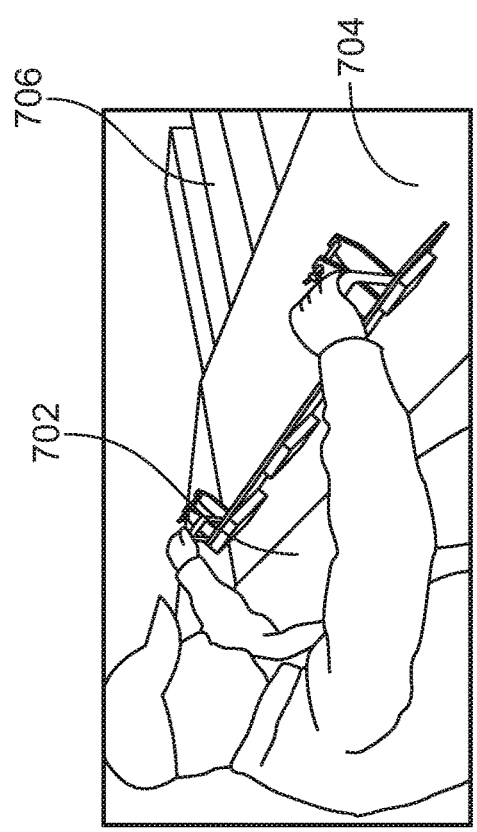

Preferred embodiments of the present invention will be described herein below with references to the accompanying drawings. In the following description, well-known functions or constructions are not described in detail, since such minutia would obscure the invention in unnecessary trivia.

Referring to FIG. 1, depicted is a front angular perspective view of magnetic ladder bracket 100 that generally comprises base 102, brackets 104, handles 106, magnet fixtures 108, and pins 110. Base 102 has a central section 112 that is long and rectangular and two end sections 114 that are shorted in length, but wider in width than central section 112. Central section 112 preferably has a uniform thickness in both central section 112 and end sections 114 for ease of manufacture. Base 102 can be made from any suitable metal, such as aluminum or steel, or any rigid plastic. The overall length of base 102 is generally determined by the size and/or ladder that is to be secured using magnetic ladder bracket 100.

Two handles 106 are coupled to a front side of end sections 114 and are preferably angled away from brackets 104 at a 30-60°, allowing a user to easily grip handles 106 to remove or place magnetic ladder bracket 100 as will be described later. Handles 106 are preferably formed from a suitable metal or rigid plastic like base 102. An outer surface of handles 106 may be covered with a textured or friction surface to aid a user in gripping handles 106. Handles 106 can be coupled to base 102 using any known means such as bolting or welding.

Magnet fixtures 108 are attached to an underside of base 102, preferably at regular intervals. The size and/or number of magnetic fixtures 108 may be varied based upon the magnetic force required to keep the magnetic ladder bracket 100 stabilized during transport. FIG. 2, which depicts a bottom plan view of magnetic ladder bracket 100, shows the spacing and orientation of magnetic fixtures 108 on the underside of base 102. Magnet fixtures 108 are coupled to base 102 preferably using a bolted connection so that each magnet fixture 108 is replaceable if needed. A bottom surface of magnet fixtures 108 may be covered or coated with a textured or fractioned surface to help prevent movement or sliding of magnetic ladder racket 100.

The magnets contained within magnet fixtures 108, to be described in more detail later), are preferably neodymium rare earth magnets (N45-N52). In FIG. 1, each magnet fixture 108 includes an N48 magnet having a magnetic pull force of 38.18 pounds, leading to a total pull force of 152.72 pounds, which provides enough pull force to withstand jet blasts from airplane jet engines or any other strong force exerted on magnetic ladder bracket 100.

Brackets 104 are coupled to end sections 114 adjacent handles 106 as depicted in FIG. 1. Brackets 104 are preferably formed from two upright metal plates that are welded to the top surface of base 102. The vertical height above base 102 and spacing of brackets 104 can be varied to accommodate almost any ladder type as should be obvious to one of ordinary skill in the art.

Pin 110 is inserted through aligned holes in bracket 104 to secure a ladder to magnetic ladder bracket 100 as will be described and depicted later. It should be obvious that other securing mechanisms, such as clamps, may also be used instead of or in addition to pins 110. Pin 110 is preferably coupled to end section 114 by leash 116 that helps to prevent misplacement of pins 110.

FIG. 3 depicts a top view of a single magnet fixture 108 comprising container 302 and cavity 304 into which the magnets 306 are placed before securing magnetic fixture 108 to base 102. Container 302 is preferably formed from nylon 66 or an ultra-high molecular weight polyethylene (UHMW).

Magnets 306, which are preferably rectangular and sized to reside within cavity 304, are surrounded on five of six sides by container 302. Specifically, FIG. 4 depicts a side cutaway view of magnet fixture 108 showing the placement of magnet 306 within cavity 304 and being surrounded by container 302. As shown in FIG. 4, the bottom of the cavity 304 forms a standoff 402 separating the magnet 306 from any contact surface. As previously described, this allows a covering or friction treatment to be provided to the exterior of magnet fixture 108 and helps to prevent magnet 306 from accidentally becoming separated or dislodged from magnetic ladder bracket 100. Specifically, FIG. 5 depicts how the strength of the magnet 306 can be strengthened or reduced by varying the thickness of standoff 402. In the embodiment of magnet fixture 108 depicted in FIG. 8, a 0.06 inch thick standoff 402 was utilized and a 0.38 magnet was utilized, producing a reduced pull force of 38.18 pounds. As shown in FIG. 5, if the thickness of the standoff 402 were reduced, the pull force could be increased, or conversely, if the thickness of the standoff 402 were increased, the pull force could be reduced substantially.

Referring back to FIG. 4, a magnet pad 404 may be used to cover a top of magnet 306 after it has been placed in cavity 304. Magnet pad 404, preferably formed of the same material as container 302, serves to properly nest and contain magnet 306 within cavity 304.

FIG. 6 depicts a left side view of magnetic ladder bracket 100. This view better depicts the angled extension of handle 106 away from bracket 104. Further, this view depicts the insertion of pin 110 through the two metal plates forming bracket 104. A tip 602 of pin 110 preferably comprises some means of securing the pin, such as with a clevis pin or a hitch pin to prevent accidental dislodgement of pin 110, especially during transportation of a ladder.

Figure 8:
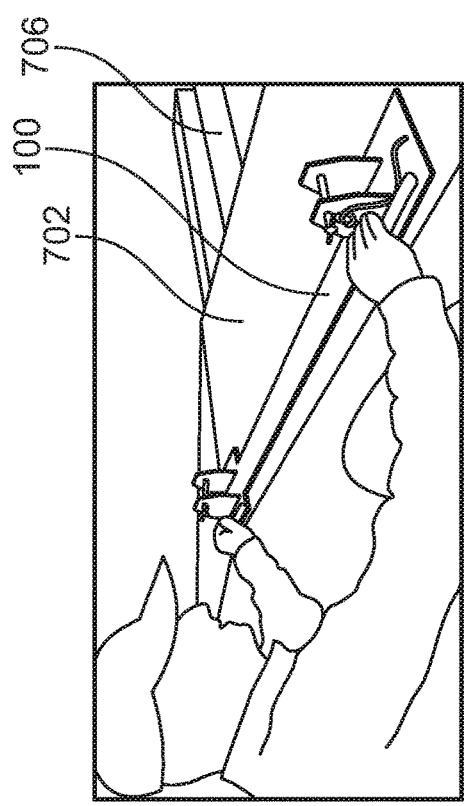

FIGS. 7-11 visually depict the steps utilized to secure magnetic ladder bracket 100 to a ferromagnetic surface, such as the top of a tug, and to secure a ladder to magnetic ladder bracket 100 for transport. It should be obvious that the depicted steps can be reversed to (a) unsecure the ladder from magnetic ladder bracket 100 and (b) remove the magnetic ladder bracket 100 from the ferromagnetic surface 702, if necessary. As depicted in FIG. 7, a user uses handles 106 to position an edge 704 of end section 114 at an angle to the ferromagnetic surface 702 of tug 706. This prevents immediate engagement of magnets 306 with the ferromagnetic surface 702 and allows the user to align the magnetic ladder bracket 100 as needed. For example, a user would align magnetic ladder bracket 100 such that it is parallel to the side of the tug 706. Next, the user slowly lowers magnetic ladder bracket 100 towards the ferromagnetic surface 702 until magnets 306 engage the ferromagnetic surface, thereby securing magnetic ladder bracket 100 to the tug 706 as depicted in FIG. 8.

Figure 9:
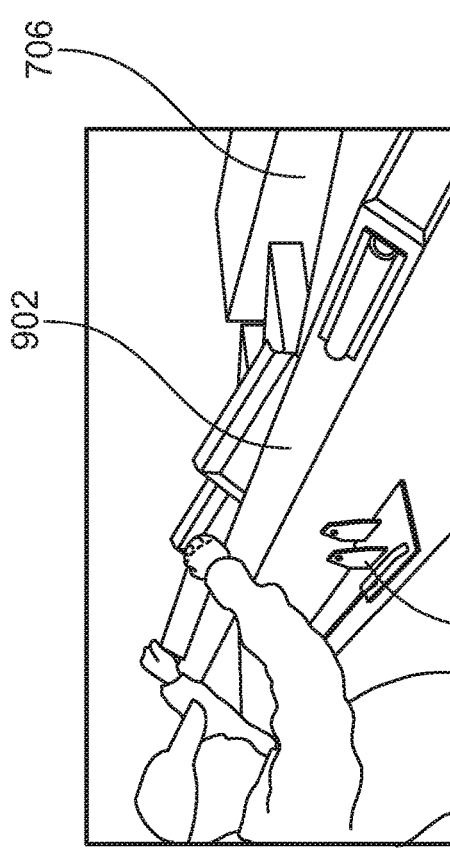
Figure 10:
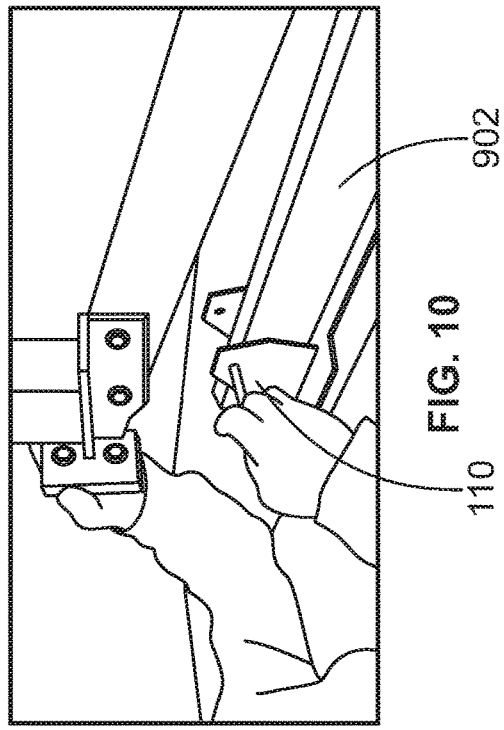

The pins 110 can now be removed from brackets 104 and the rail of ladder 902 can be inserted into the gap (e.g., see FIG. 6) between brackets 104 as depicted in FIG. 9. The pins 110 are then inserted into brackets 104 to secure the ladder 902 as depicted in FIG. 10. Because the brackets have a height much greater than the gap, rotation of the rail of the ladder 902 is prevented and thus only one magnetic ladder bracket 100 is needed to secure ladder 902. However, it should be obvious that another magnetic ladder bracket 100 could also be used to secure the opposing rail of ladder 902 if needed.

FIG. 11 depicts the ladder 902 fully secured by magnetic ladder bracket 100 on ferromagnetic surface 702 of tug 706. As already discussed, because the magnets 306 provide a total pull force of 152.72 pounds, there is no danger of magnetic ladder bracket 100 becoming dislodged from tug 706, even near jet blasts from jet blast engines.

Figure 14:
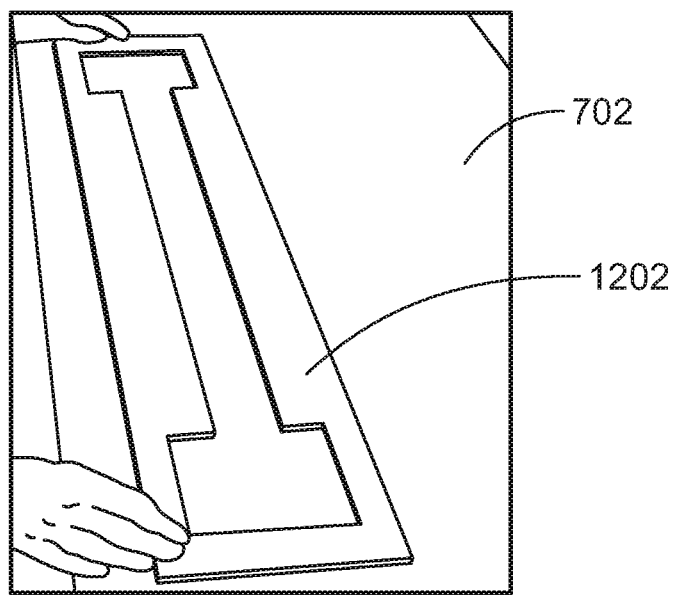
Figure 15:
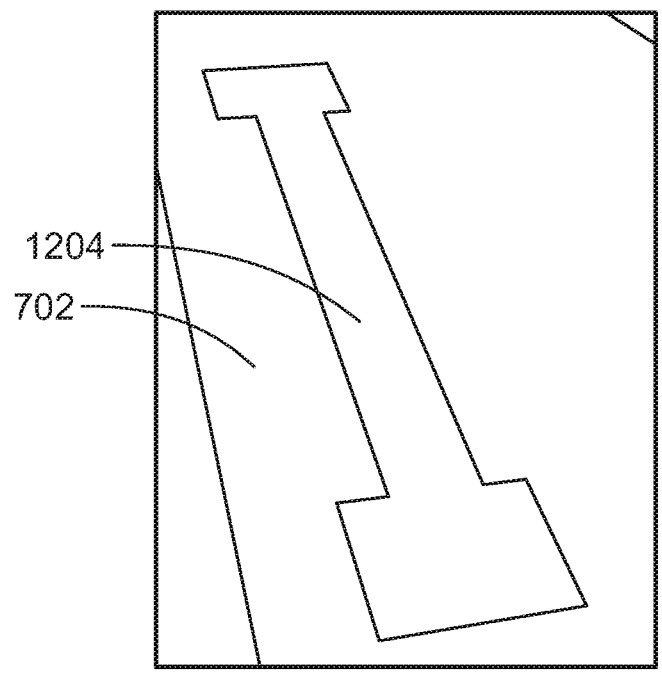

Referring next to FIG. 12, depicted is a bracket stencil 1202. The center of bracket stencil 1202 has a shape conforming to an outline of magnetic ladder bracket 100. However, it should be obvious that other cutout shapes could be used, such as cutouts only centered corresponding to end sections 114, central section 112, etc. To utilize bracket stencil 1202, the user places it on the ferromagnetic surface 702 where the magnetic ladder bracket 100 is to be placed during use as depicted in FIG. 13. Using spray paint or any other type of marking compatible with bracket stencil 1202, the center of bracket stencil 1202 is used to create a marking of ferromagnetic surface 702 as depicted in FIG. 14. Tape may be used around bracket stencil 1202 to hold it in position and/or to avoid the spray paint from getting anywhere else on ferromagnetic surface 702. After removing bracket stencil 1202, magnetic ladder template 1204 is marked on ferromagnetic surface 702 and provides an easy marker that can be used when attaching the magnetic ladder bracket as previously described with reference to FIGS. 7-11.

While the present invention has been described with respect to what are currently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation, so as to encompass all such modifications and equivalent structures and functions.

All U.S. and foreign patent documents, all articles, all brochures and all other published documents discussed above are hereby incorporated by reference into the Detailed Description of the Preferred Embodiment.

The invention claimed is:
1. A magnetic ladder bracket comprising:
a base comprising a central portion, a first end portion, and a second end portion,
wherein a length of the central portion is greater than a length of the first end portion and the second end portion, and
wherein a width of the first end portion and a width of the second end portion are both greater than a width of the central portion;
a plurality of magnet fixtures coupled to an underside of the base,
a first bracket coupled to the first end portion;
a second bracket coupled to the second end portion;
a first handle coupled to the first end portion adjacent the first bracket,
wherein the first handle is angled away from the first bracket at a first angle;

a second handle coupled to the second end portion adjacent the second bracket,
wherein the second handle is angled away from the second bracket at a second angle;
a first pin coupled to the first end portion by a first leash; and
a second pin coupled to the second end portion by a second leash,
wherein the first bracket is formed from a first upright plate and a second upright plate coupled to the first end portion in parallel,
wherein the first upright plate comprises a first hole aligned with a second hole formed in the second upright plate, and
wherein the first pin is configured to be completely inserted through the first hole and the second hole.

2. The magnetic ladder bracket according to claim 1, wherein the first angle is equal to the second angle.

3. The magnetic ladder bracket according to claim 2, wherein the first angle is approximately 30-60°.

4. The magnetic ladder bracket according to claim 1, wherein a thickness of the central portion, a thickness of the first end portion, and a thickness of the second end portion are all equal.

5. The magnetic ladder bracket according to claim 1, wherein at least a portion of the first handle is covered with a textured or a fractioned surface.

6. The magnetic ladder bracket according to claim 1,
wherein a first magnet fixture of the plurality of magnet fixtures is coupled to the first end portion, and
wherein a second magnet fixture of the plurality of magnet fixtures is coupled to the second end portion.

7. The magnetic ladder bracket according to claim 6, wherein at least a third magnet fixture of the plurality of magnet fixtures is coupled to the central portion.

8. The magnetic ladder bracket according to claim 1, wherein the plurality of magnet fixtures exert a total combined pull force greater than or equal to 150 pounds.

9. The magnetic ladder bracket according to claim 1, wherein the first pin is a clevis pin or a hitch pin.

10. The magnetic ladder bracket according to claim 1, wherein each magnet fixture comprises:
a rectangular container;
a cavity formed in a center of the rectangular container; and
a magnet snug fit within the cavity.

11. The magnetic ladder bracket according to claim 10, wherein a bottom of the cavity separates the magnet from direct contact with other magnets or ferromagnetic surfaces.

12. The magnetic ladder bracket according to claim 10, wherein each magnet is a rare earth magnet.

13. The magnetic ladder bracket according to claim 10, wherein the magnet is sealed within the cavity using a magnet pad.

14. A method of securing a ladder to a ferromagnetic surface using a magnetic ladder bracket, the method comprising:
aligning a leading edge of the magnetic ladder bracket along the ferromagnetic surface at a desired angle,
wherein the magnetic ladder bracket is aligned using handles coupled to the magnetic ladder bracket;
rotating the magnetic ladder bracket downward while maintaining contact between the leading edge and the ferromagnetic surface until a plurality of magnet fixtures located along an underside of the magnetic ladder bracket are magnetically coupled to the ferromagnetic surface;
removing securing means from one or more brackets coupled to the magnetic ladder bracket;
placing a rail of the ladder into the one or more brackets; and
placing the securing means on the brackets to secure the ladder to the ferromagnetic surface.

15. The method according to claim 14, wherein the ferromagnetic surface is coupled to a top surface of a tug.

16. The method according to claim 14, wherein the securing means comprises pins placed through openings in the one or more brackets.

* * * * *